United States Patent [19]
Abrams et al.

[11] Patent Number: 5,584,489
[45] Date of Patent: Dec. 17, 1996

[54] PRIMARY AND SECONDARY SEAL ASSEMBLIES WITH CONTACTING CONVEX SURFACES

[75] Inventors: Philip I. Abrams, Houston, Tex.; Richard Shepherd, Watton-at-Stone; Justin R. Hawkes, Hertford, both of United Kingdom

[73] Assignee: Exxon Production Research Company, Houston, Tex.

[21] Appl. No.: 477,540

[22] Filed: Jun. 7, 1995

[51] Int. Cl.$^6$ ........................................ F16J 15/26
[52] U.S. Cl. .................. 277/123; 277/125; 277/188 A
[58] Field of Search ...................... 277/63, 64, 116.2, 277/116.4, 117–124, 125, 152, 165, 188 R, 188 A, 205

[56] References Cited

U.S. PATENT DOCUMENTS

| | | | |
|---|---|---|---|
| 3,009,721 | 1/1961 | Newton | 277/205 |
| 3,085,628 | 4/1963 | Malone | 277/117 |
| 3,171,492 | 3/1965 | Cochran | 277/117 |
| 3,663,076 | 5/1972 | Valente | 277/120 |
| 4,192,519 | 3/1980 | Buggele | 277/117 |
| 4,349,205 | 9/1982 | McGee et al. | 277/117 |
| 4,406,469 | 9/1983 | Allison | 277/123 |
| 4,438,935 | 3/1984 | Lees | 277/123 |
| 4,473,231 | 9/1984 | Tilton et al. | 277/124 |
| 4,811,959 | 3/1989 | Bullard et al. | 277/124 |

FOREIGN PATENT DOCUMENTS

| | | | |
|---|---|---|---|
| 3521525 | 11/1986 | Germany | 277/165 |
| 89125 | 4/1937 | Sweden | 277/188 A |
| 430251 | 1/1975 | U.S.S.R. | 277/205 |
| 722462 | 1/1955 | United Kingdom | 277/125 |
| 1075111 | 7/1967 | United Kingdom | 277/188 A |
| 1289141 | 9/1972 | United Kingdom | 277/165 |
| 2202283 | 3/1988 | United Kingdom | F16J 15/12 |

OTHER PUBLICATIONS

"Seals and Sealing Handbook", 3rd Ed., Melvin W. Brown, Elsevier Science Publishers Limited (1990).

"Greene, Tweed GT Rings—10,000 Series, 12,000 Series", Greene, Tweed & Co., Inc., Kulpsville, PA (GT 1086).

"A User's Approach to Qualification of Dynamic Seals for Sour–Gas Environments", Philip I. Abrams, Kevin J. Kennelley, and Dale V. Johnson, SPE Production Engineering, (pp. 217–220) Aug. 1990.

"Factors Influencing Dynamic Sealing in Well Environments at High Temperatures and Pressures", P. I. Abrams, A. M. Priest, Richard Shepherd, R. P. Campion, and T. S. Chilton, Offshore Technology Conference OTC 7333, Reference 2 (pp. 685–692) (1993).

*Primary Examiner*—Scott Cummings
*Attorney, Agent, or Firm*—J. Mark Gilbreth

[57] ABSTRACT

A seal assembly for use in completion and production operations of a subterranean hydrocarbon well for sealing the annular space between the production casing and tubing, which assembly generally includes primary seal members having a circular, oval or elliptical shaped cross-sections, and secondary seal members having convex sections for abutting the primary seal members. The assembly further includes retainers on the tubing which define the seal bore into which the seal members are positioned, and a polished surface on the casing for allowing movement of the seal members against the casing.

18 Claims, 10 Drawing Sheets

PRIMARY AND SECONDARY SEAL ASSEMBLIES WITH CONTACTING CONVEX SURFACES

BACKGROUND OF THE INVENTION

1. Field of the Invention

The present invention relates to seal assemblies. In another aspect, the present invention relates to seal assemblies for use in annular spaces or as T-seals. In even another aspect, the present invention relates to seal assemblies for use in subterranean wells. In still another aspect, the present invention relates to seal assemblies for use in the completion and production operations of oil and gas wells. In yet another aspect, the present invention relates to multi-component seal assemblies for use in the completion and production operations of oil and gas wells. In even still another aspect, the present invention relates to multi-component seal assemblies for use in the completion and production operations of oil and gas wells, wherein the seal assemblies comprise sealing and backup elements.

2. Description of the Related Art

Seal systems have become a critical component of completion and production operations of hydrocarbon wells. Traditional downhole completions utilize packers and seal assemblies on the end of the tubing string to isolate the tubing/casing annulus from the produced hydrocarbons. Because oil and gas production has moved to higher temperatures and pressures, another completion scheme has emerged suitable for such conditions, that can be used as a compliment with or as a substitute for packers. This other completion scheme utilizes a polished-bore receptacle ("PBR") run as an integral part of the production casing string.

Completion and production seal assemblies for hydrocarbon wells are dominated by primary chevron-shaped seal members. By their very nature, chevron-shaped seal members provide only unidirectional sealing. Thus, to provide sealing from both uphole and downhole pressures, it is generally necessary to utilize one or more pairs of chevron-shaped seal members oriented 180' apart.

There have been many attempts in the prior art to provide an improved seal assembly.

U.S. Pat. No. 4,473,231, issued Sep. 25, 1984 to Tilton et al., discloses a dynamic seal for a subterranean well. This dynamic seal includes vee- or chevron- shaped primary elastomeric sealing elements, and further includes a backup member on each side of the chevron-shaped seal U.S. Pat. No. 4,406,469, issued Sep. 27, 1983 to Allison, discloses a plurality of back-to-back vee- or chevron- shaped sealing members. Backup members are positioned on each side of this plurality.

UK Patent Application No. GB 2,202,283A, published Sep. 21, 1988, discloses a seal stack having five annular seal members, with the outermost members each being a metal spacer, and positioned between are two chevron-shaped seal members, and a knitted metal mesh member to eliminate extrusion of the seal members.

In spite of the multiplicity of prior art seal assemblies, there is a need for an improved seal assembly.

There is another need in the art for an improved annular and seal assembly.

There is even another need in the art of completing and producing hydrocarbon wells for an improved annular seal assembly.

There is still another need in the art of completing and producing hydrocarbon wells for a bidirectional annular seal assembly.

These and other needs in the art will become apparent to those of skill in the art upon review of this specification, including its claims and drawings.

SUMMARY OF THE INVENTION

It is one object of the present invention to provide for an improved seal assembly.

It is another object of the present invention to provide for an improved annular seal assembly.

It is still another object of the present invention to provide for a bidirectional annular seal assembly.

These and other objects of the present invention will become apparent to those of skill in the art upon review of this patent specification, including its claims and drawings.

According to one embodiment of the present invention there is provided a seal assembly for use in a subterranean well to seal the annular space between the production casing and the production tubing. The assembly generally includes top and bottom retainers positioned on the tubing and defining between them an annularly shaped seal bore or seal annulus which opens into the annular space and adjacent a polished surface on the polished bore receptacle. The assembly also includes an annularly shaped primary seal member positioned in the seal annulus, with the primary seal member having a cross-sectional shape. Preferably, the primary seal member has a circular, oval or elliptical cross-sectional shape. The assembly further includes two annularly shaped secondary members positioned in the bore and abutting the convex portions of the primary seal members.

According to another embodiment of the present invention there is provided a seal assembly for sealing the annular space between an inner and outer conduit, which generally includes an annularly shaped primary seal member positioned in the annular space, with the seal member having a cross-sectional shape with a top convex portion and a bottom convex portion. Preferably, the primary seal member has a circular, oval or eliptical cross-section. The assembly also includes an annularly shaped secondary member positioned in the annular space and abutting the convex portion of the primary seal member.

According to even another embodiment of the present invention there is provided a seal assembly for sealing a passage between a first substrate and a second substrate, which generally includes a primary seal member positioned in the passage, with the primary seal member having a cross-sectional shape with a top convex portion and a bottom convex portion. Preferably, the primary seal member has a circular, oval or ellipital cross-section. The assembly further includes a secondary member positioned in the passage and abutting the convex portion of the primary seal members.

DETAILED DESCRIPTION OF THE INVENTION

Figure 1:
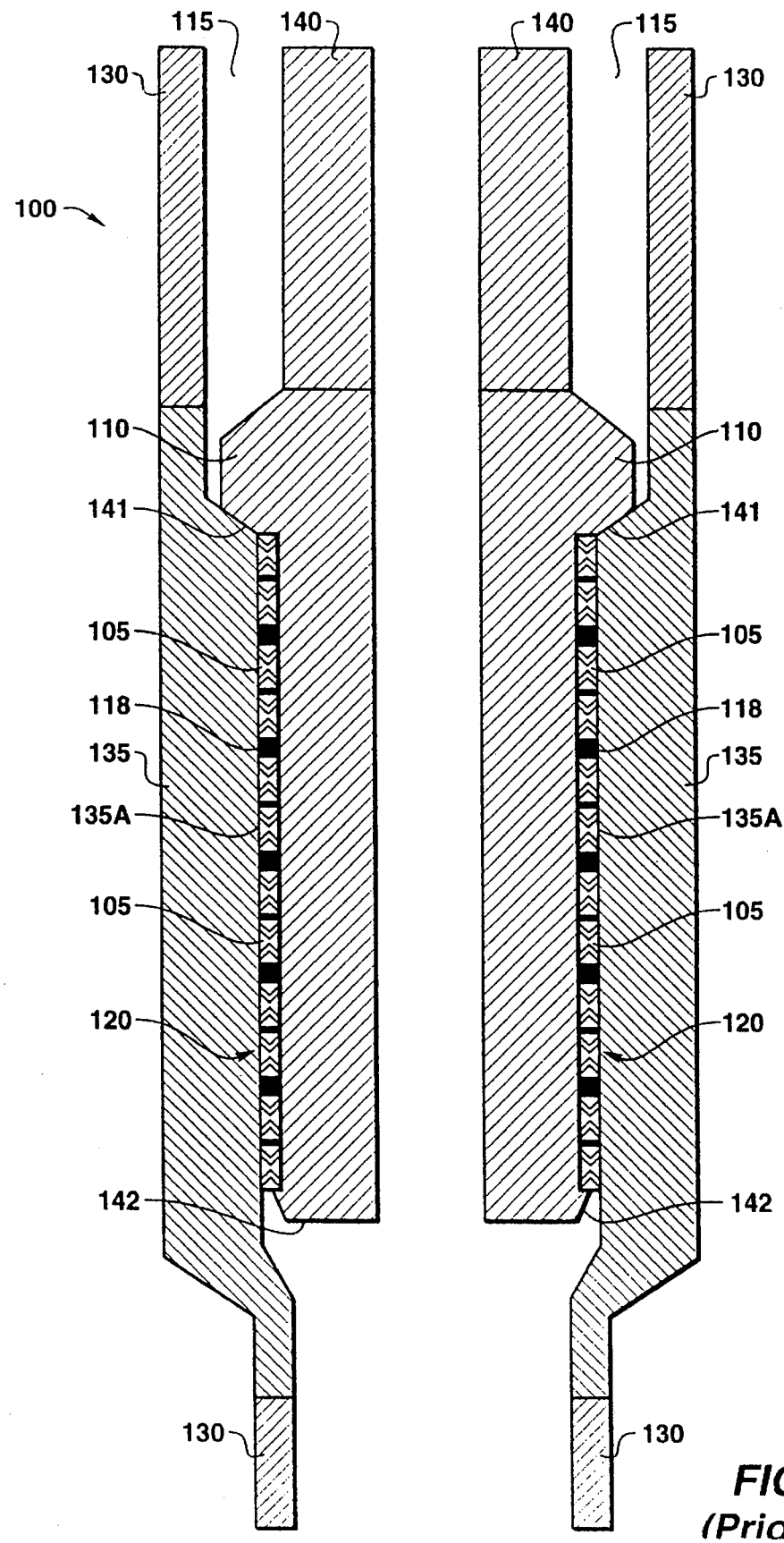
FIG. 1 is a cross-sectional view of a prior art well bore completion scheme 100 showing production tubing 140, production casing 130, annulus 115 between tubing 140 and casing 130, and seal assembly 110.

Before describing the present invention, reference is first made to FIG. 1 which shows the prior art chevron-shaped seal stack.

FIG. 1 is a cross-sectional view of a prior art well bore completion scheme 100 showing production tubing 140, production casing 130, annulus 115 between tubing 140 and casing 130, and seal assembly 110. Seal assembly 110 is attached to the end of production tubing 140, and includes a multiplicity of chevron-shaped seal members 105 shown positioned in seal annulus 120 in annulus 115 between casing 130 and tubing 140. Two or more adjacent seal members 105 form a seal stack. Spacers 118 separate stacks of seal members 105 from each other. Upper seal annulus retainers 141 and lower seal annulus retainers 142 of tubing 140 help restrain seal members 105. Casing 130 includes a polished bore receptacle region 135, having a polished surface 135A along which seal members 105 move.

In such a polished bore receptacle ("PBR") the seal assembly 110 can move axially along the polished surface 135A. The smooth surface of the polished surface 135A provides tight contact with seal assembly 110, thereby isolating annulus 115 from produced fluids.

Figure 2:
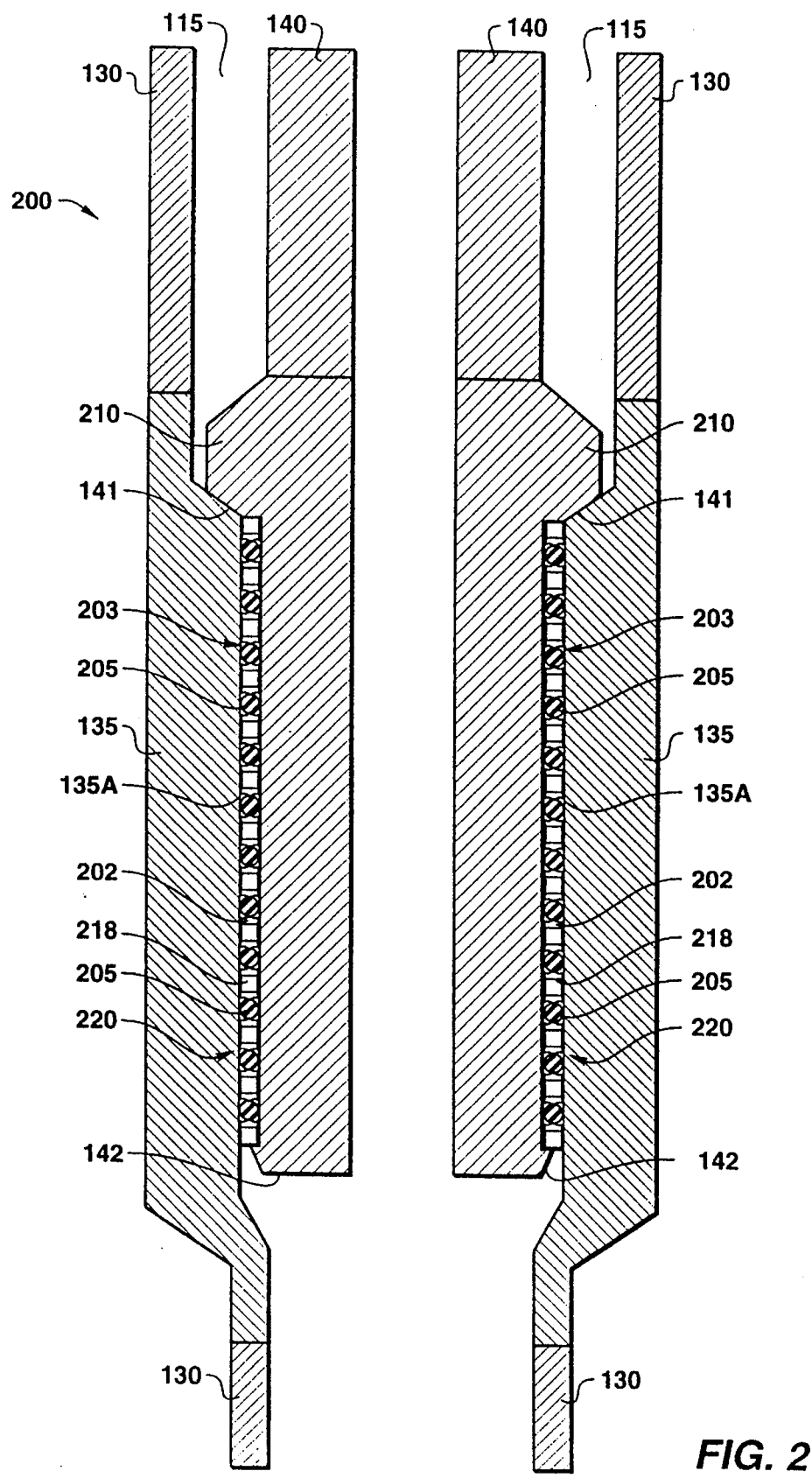
FIG. 2 is a cross-sectional view of one embodiment of the present invention showing well bore completion scheme 200, including, production tubing 140, production casing 130, annulus 115 between tubing 140 and casing 130, and present invention seal assembly 210.

Referring now to FIG. 2, there is shown one embodiment of the present invention. FIG. 2 is similar to FIG. 1 except that the seal members of the present invention are utilized. In the following description, the terms "upper" and "lower", "top" and "bottom", and the like are used to distinguish one side of the seal assembly from the other. However, those skilled in the art will understand that use of these terms does not limit the present invention to situations in which it is vertically oriented. Indeed, the present invention may be utilized in any orientations desired.

FIG. 2 is a cross-sectional view of one embodiment of the present invention showing well bore completion scheme 200, including, production tubing 140, production casing 130, annulus 115 between tubing 140 and casing 130, and present invention seal assembly 210. Seal assembly 210 is attached to the end of production tubing 140. Seal assembly 210 includes a multiplicity of primary seal members 205 having circularly-shaped cross-sections, bounded by wavy-faced secondary seal members 202, shown positioned in seal annulus 120 in annulus 115 between casing 130 and tubing 140. In the embodiment shown, a multiplicity of seal stacks 203 are each formed by seal members 205 bounded by secondary seal members 202. Back up elements 218 separate seal stacks from each other. Seal annulus upper retainer 141 and seal annulus lower retainer 142 of tubing 140 help restrain the seal stack members 202, 205 and 218 in seal annulus 120. Casing 130 includes a polished bore receptacle region 135 along which seal members 203 move.

In such a polished bore receptacle ("PBR"), the seal assembly 210 can move axially along the polished surface 135A. The smooth surface of the polished surface 135A provides tight contact with seal assembly 210, thereby isolating annulus 115 from the produced fluids and eliminating the need for a traditional packer.

Figure 3:
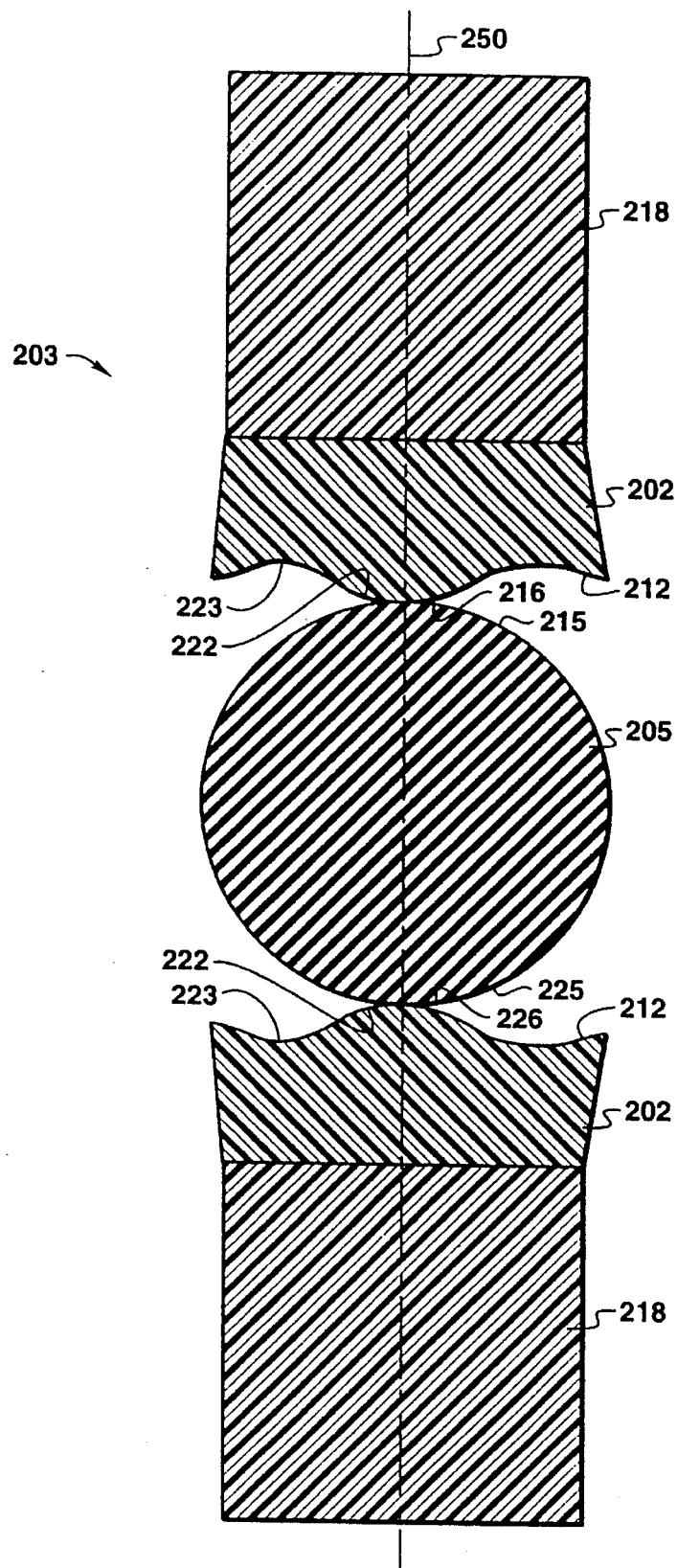
FIG. 3 is an enlarged view of a seal stack 203 of FIG. 2, showing primary seal member 205, secondary seal 202 and back-up member 218.

Referring now to FIG. 3 there is shown an enlarged cross-sectional view of a seal stack 203 of FIG. 2, showing primary seal member 205, secondary seal 202 and back-up member 218. Line 250 is the center line (i.e., the radial mid-point) between the tubing 140 and the PBR 135.

Primary seal member 205 includes top face 215 which contacts the top secondary seal 202, and a bottom face 225 which contacts the bottom secondary seal member 202. In the practice of the present invention, the cross-sectional shape of primary seal 205 may be any shape provided that faces 215 and 225 each include at least one convex portion positioned across the center line 250 for abutting the top and bottom secondary seals, respectively. Center line 250 may be envisioned as annularly shaped extending circumferentially around and centered in the annular space between seal assembly 110 and PBR 135.

While preferred, it is not necessary that the convex portion of faces 215 and 225 be centered on the center line 250, only that some portion of the convex portion be across center line 250. In the embodiment shown, the cross-sectional shape of primary seal 205 is circular, which provides faces 215 and 225 with convex portions 216 and 226 for abutting the secondary seals 202.

Faces 215 and 225 may by any suitable shape provided that the shape includes at least one convex portion positioned on the center line 250 for abutting the top and bottom secondary seals. Of course, center line 250 extends annularly around completion scheme 200.

It is not necessary that faces 215 and 225 be the same shape. Examples of suitable shapes for faces 215 and 225 include curvilinear, wavy, and sinusoidal shapes, as well as portions of circles, ovals or elipses.

Primary seal 205 may be any suitable shape provided that the shape will span the space between tubing 140 and casing 135, at least when compressed under pressure, but preferably even when not under pressure, and provided that faces 215 and 225 include at least one convex portion positioned on the center line 250 for abutting secondary seals. Non-limiting examples of shapes suitable as the cross-sectional shape of primary seal member 205 includes circular, oval and elliptical.

Secondary seal members 202 includes face 212 for abutting primary seal member 205. Secondary seal member 202 may be any suitable shape provided that the shape includes at least one convex portion positioned on the center line 250 for abutting primary seal member 205. Additionally, secondary seal 202 should span the annular space 115 between tubing 140 and PBR 135, at least when compressed under pressure, but preferably even when not under pressure.

Face 212 of secondary seal 202 may be any shape including concave, convex, flat, or any combination thereof. Preferably, face 212 will include a convex portion 222 for contacting convex portions 216 or 226 of primary seal member 205. Examples of suitable shapes for face 212 include curvilinear, wavy, and sinusoidal shapes, as well as portions of circles, ovals or ellipses. Preferably, face 212 has a wavy shape. In the embodiment shown, face 212 includes convex portion 222 and concave portion 223. In addition to that shown in FIG. 3, other nonlimiting Examples of suitable cross-sectional shapes for secondary seal member 202 include circular, oval and elliptical.

Referring now to FIGS. 4–6 and 8, 9 in which reference numbers are as described above, there are shown nonlimiting examples of suitable cross-sectional shapes for primary seal 205.

Figure 4:
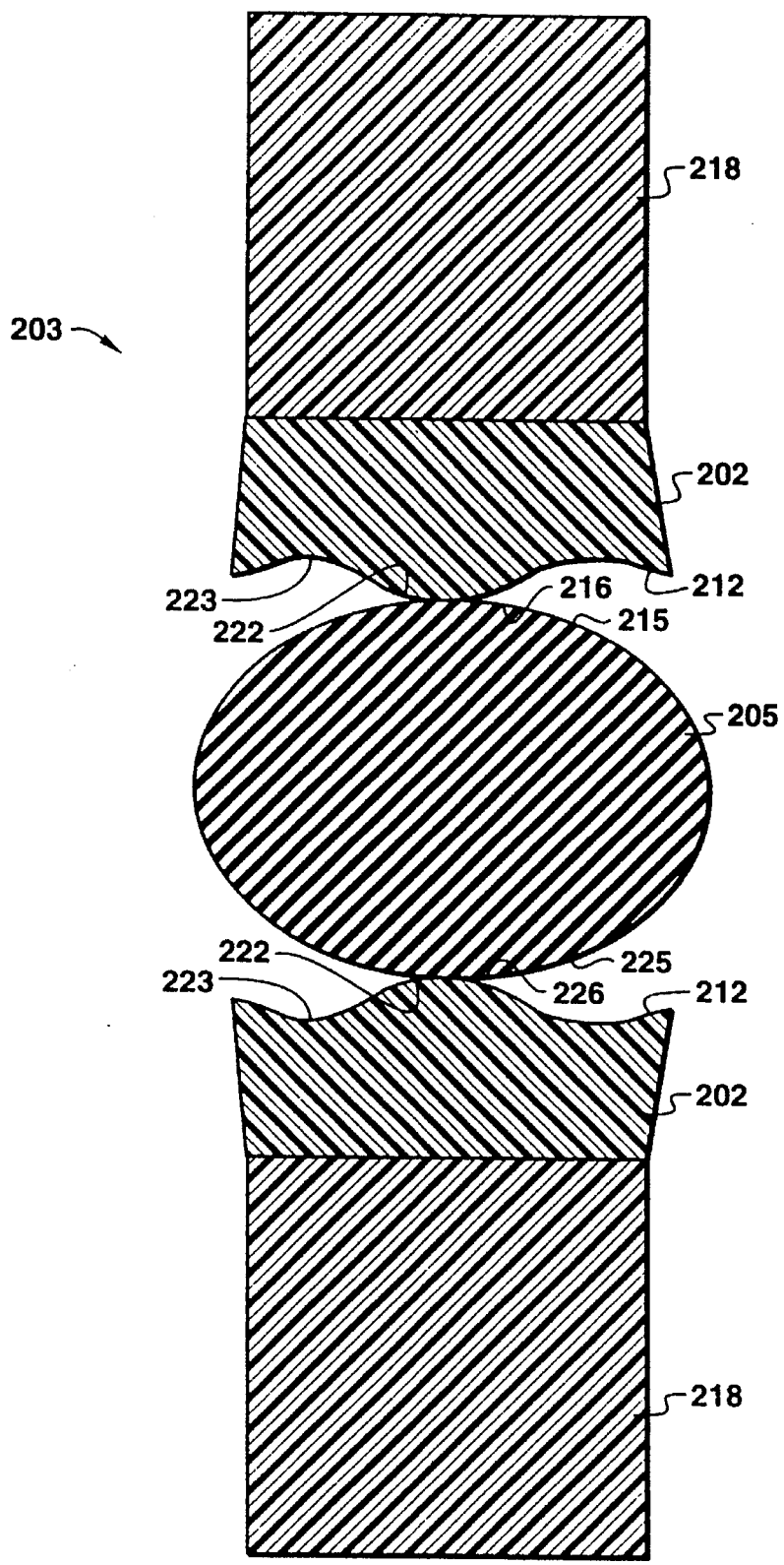
FIG. 4 is a view of a wide oval embodiment of seal stack 203, showing a wide oval primary seal member 205, secondary seal 202 and back-up member 218.

FIG. 4 is a view of a wide oval embodiment of seal stack 203, showing a wide oval primary seal member 205, secondary seal 202 and back-up member 218.

Figure 5:
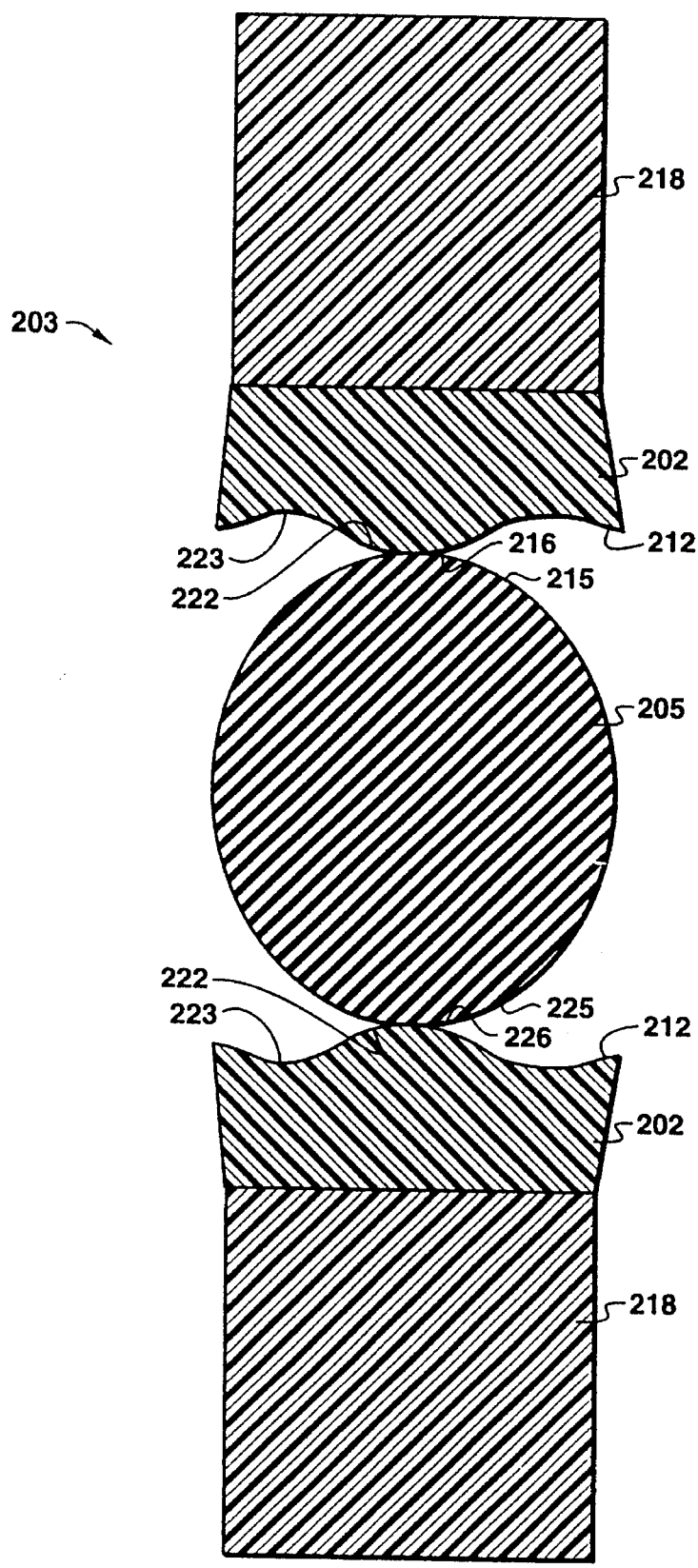
FIG. 5 is a view of a tall oval embodiment of seal stack 203, showing a tall oval primary seal member 205, secondary seal 202 and back-up member 218.

FIG. 5 is a view of a tall oval embodiment of seal stack 203, showing a tall oval primary seal member 205, secondary seal 202 and back-up member 218.

Figure 6:
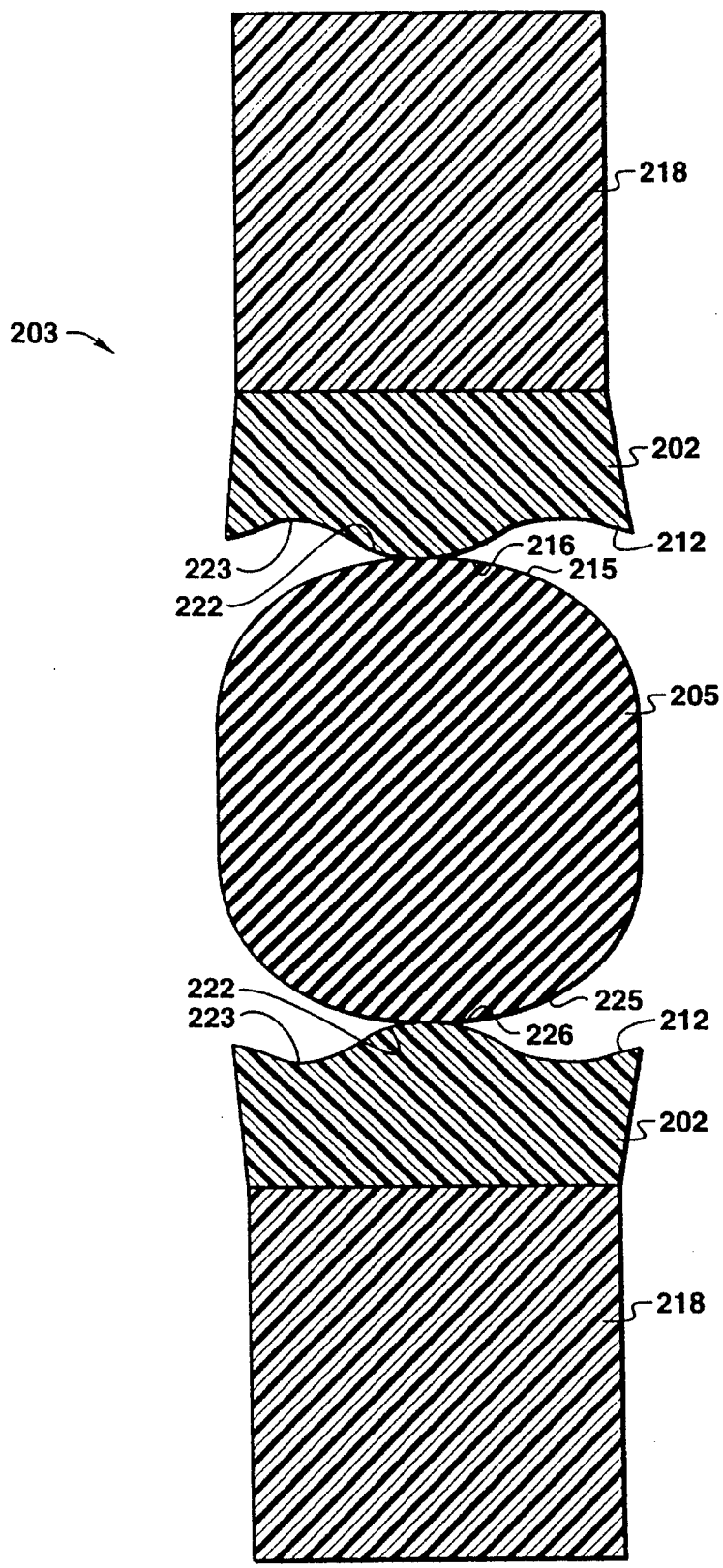
FIG. 6 is a view of an elongated oval embodiment of seal stack 203, showing an elongated oval primary seal member 205, secondary seal 202 and back-up member 218.

FIG. 6 is a view of an elongated oval embodiment of seal stack 203, showing a elongated oval primary seal member 205, secondary seal 202 and back-up member 218.

Figure 8:
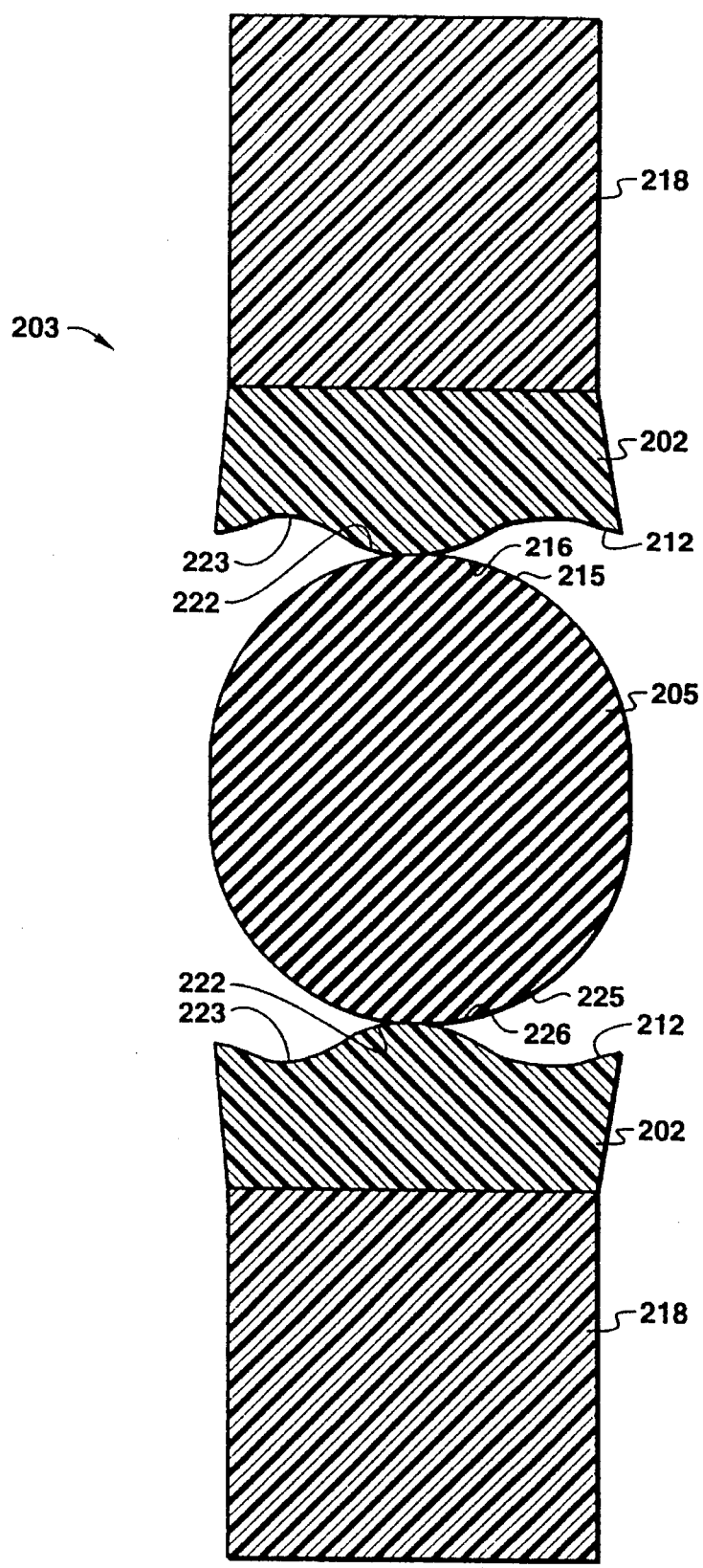
FIG. 8 is a view of another alternative shape of seal stack 203, showing a wide oval primary seal member 205, secondary seal 202 and back-up member 218.

FIG. 8 is a view of another alternative shape of seal stack 203, showing a wide oval primary seal member 205, secondary seal 202 and back-up member 218.

Figure 9:
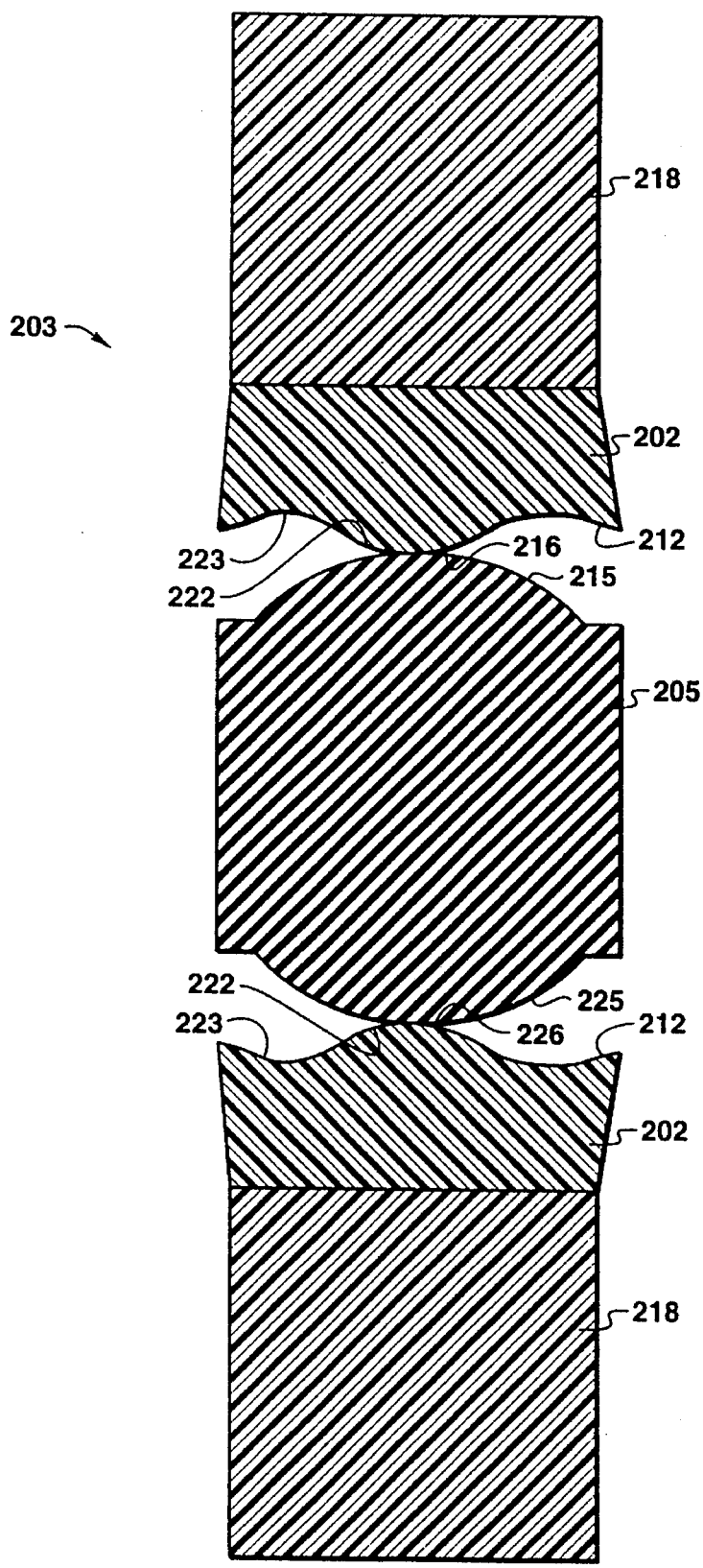
FIG. 9 is a view of even another alternative shape of seal stack 203, showing a tall oval primary seal member 205, secondary seal 202 and back-up member 218.

FIG. 9 is a view of even another alternative shape of seal stack 203, showing a tall oval primary seal member 205, secondary seal 202 and back-up member 218.

Figure 7A:
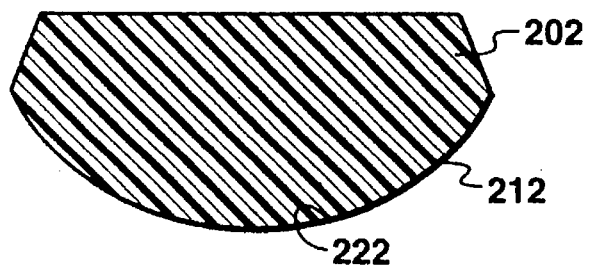
FIGS. 7A, 7B and 7C show nonlimiting examples of suitable shapes for secondary seal member 202 of the present invention.
Figure 7B:
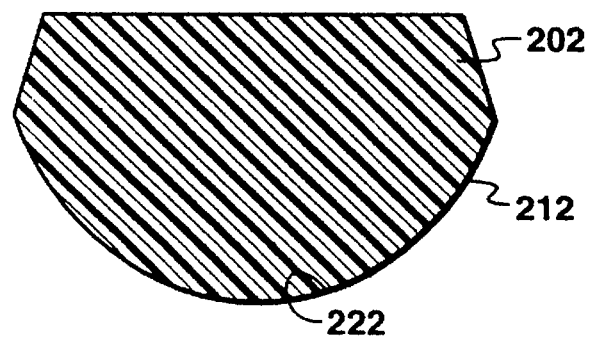
Figure 7C:
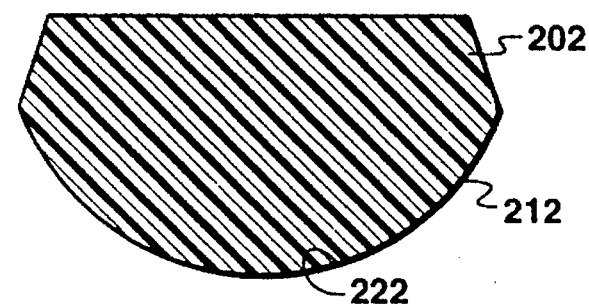

In additional to the cross-sectional shape of secondary seal 202 shown in FIGS. 3–6, additional nonlimiting examples of suitable shapes for secondary seal member 202 are shown in FIGS. 7A, 7B and 7C.

As the shape of backup members 218 is not critical to the present invention, any suitable shapes may be utilized.

It is to be understood that primary seal member 205, secondary seal members 202 and back-up member 218 may be made of any suitable material useful for the environment in which the seal apparatus will be utilized. Such materials include metals, as well as the whole array of elastomeric, thermoplastic and thermoset materials which will provide the proper chemical and mechanical properties. Non-limiting examples of such suitable materials include tetrafluoroethylene/propylene ("TFE/P"), polyetheretherketone ("PEEK"), polytetrafluoroethylene ("PTFE").

EXAMPLE

The test apparatus and procedures utilized are generally described in OTC No. 7333, "Factors Influencing Dynamic Sealing in Well Environments at High Temperatures and Pressures", P. I. Abrams et al, 25th Offshore Technology Conference, May 3–6, 1993, at 685–693, and in "A User's Approach to Qualification of Dynamic Seals for Sour-Gas Environments", P. I. Abrams et al., SPE Production Engineering, August 1990, at 217–220, both herein incorporated by reference.

The test apparatus is a dynamic seal stack test facility with operating limits of 250° C. (482° F.) and 103 MPa (15,000 psi), suitable for the real time monitoring of seal behavior under a range of gas/liquid test fluids including mixtures containing hydrogen sulfide.

Figure 10:
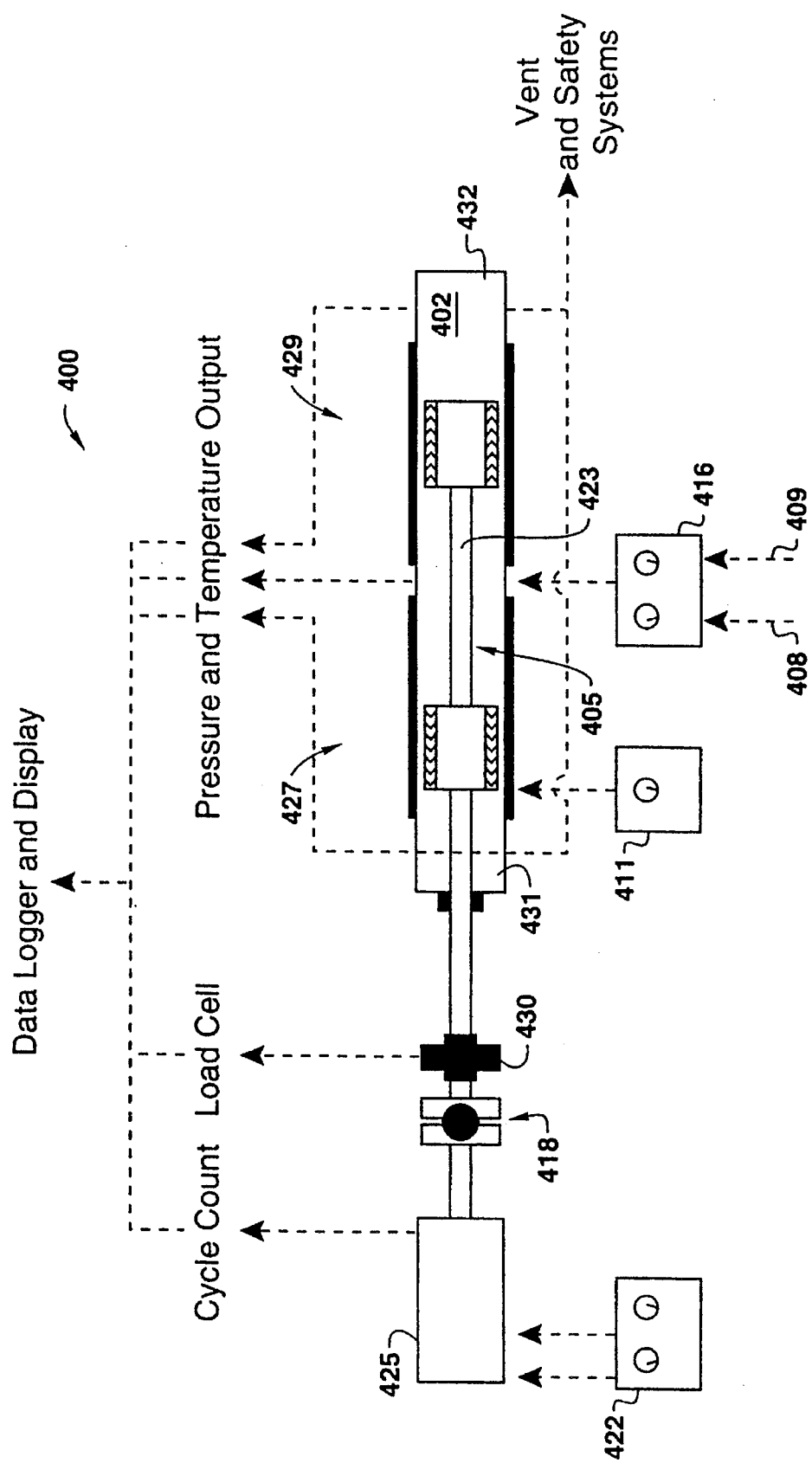
FIG. 10 is a schematic of test apparatus 400, which comprises a polished bore pressure vessel 402 and a centrally-located reciprocating mandrel 423 with two seal stack locations 427 and 429 containing the high pressure zone 405 between them.

FIG. 10 is a schematic of test apparatus 400, which comprises a polished bore pressure vessel 402 and a centrally-located reciprocating mandrel 423 with two seal stack locations 427 and 429 containing the high pressure zone 405 between them. The two stack locations have been designated "west stack" 427 and "east stack" 429 at opposite ends of mandrel 423.

Test apparatus 400 further includes temperature control 411, gas input line 408, liquid input line 409, and pressure and mixing controller/valve 416. Transducers monitor temperatures, pressures (on both sides of each seal stack) and the forces generated during mandrel motion, with transducer outputs displayed locally in real-time and continuously recorded using a computer-based logging system.

During testing, the test media liquids and/or gases are introduced into the high pressure zone 405 between the seal stack test positions 427 and 429. The test pressure is applied to the test media via a booster pump and an isolation chamber. Leakage is measured via the pressure buildup in the regions 431 and 432. Motor control 422 is utilized to control the reciprocation motor 425 that drives reciprocating mandrel 423 inside vessel 402. As shown in FIG. 10, flange 418 connects reciprocation motor 425 to load cell 430.

The testing conditions were generally as follows:

The seal stacks were reciprocated on a mandrel in a test vessel at temperatures up to 200° C. (392° F.) with pressures up to 103 MPa (15,000 psi) in region 405. Seal stack reciprocating continued for up to 6,300 cycles (considered to be a ten-year equivalent lifetime) or until seal stack failure, whichever occurred first. Test environment was generally a methane gas/water mix.

For direct comparison of the conventional chevron seal stacks against the designs of the present invention, the same materials were utilized in all tests, which materials were as follows:

Primary Seal: Aflas® elastomer (TFE/P, or tetrafluoroethylene/propylene).

Secondary Seal: 12% glass reinforced PTFE (polytetrafluoroethylene, also known as Teflon®).

Back-up Seal: Carbon fiber reinforced PEEK (polyetheretherketone).

The above arrangement will be referred to as the ATP stack (Aflas®, Teflon®, PEEK).

(Aflas® is a trademark of Asahi Glass Company, and Teflon® is a trademark of DuPont Company.)

During the test program, a direct comparison of the leakage rate of two ATP stacks was made at 200° C. (392° F.) and 103 MPa (15,000 psi). Leakage as a function of seal movement velocities was measured for a conventional vee or chevron ATP seal stack, and for an ATP O-ring stack of the present invention utilizing a flat backup for the secondary seal member.

Also evaluated was the performance of a "curved-face" ATP O-ring seal stack and a "wavy-face" ATP O-ring seal stack of the present invention 200° C. (392° F.) and 103 MPa (15,000 psi) in a methane/water mix. The "wavy-face" ATP O-ring seal stack completed 8,500 cycles of reciprocation with no failure and no leakage while the standard ATP chevron seal stack failed after 5,000 cycles.

The results of the above examples are presented in Table 1 below which shows the seal leakage as a function of seal movement velocities. Table 1 clearly illustrates that the ATP O-ring seal stacks have a much lower leakage rate than the conventional ATP chevron seal stack, generally by a factor of about 10. Additionally, among the O-ring stacks, the "wavy" secondary sealed better than the "curved" secondary which sealed better than the "flat" secondary.

TABLE 1

| | | Leak rates observed at different seal velocities at 200° C./15,000 psi water/methane. | | | |
|---|---|---|---|---|---|
| Cycles | Velocities (in/min) | ATP CHEVRON (in³/min STP) | ATP O-RING Flat secondary seal (in³/min STP) | ATP O-RING Curved secondary seal (in³/min STP) | ATP O-RING Wavy secondary seal (in³/min STP) |
| AT 3500 | 3.5 | | | 1 TO 2 | 0 TO 0.5 |
| AT 4000 | 0 | 0 | 0 | | |
| | 1.2 | 4 TO 8 | 0 TO 1 | | |
| | 3.4 | 8 TO 15 | 1 TO 4 | | 0 TO 0.5 |
| | 6.8 | 20 TO 30 | 4 TO 8 | | |
| AT 6000 | 0 | 0 | 0 | | |
| | 1.2 | 10 TO 20 | 2 TO 4 | | |
| | 3.4 | 70 TO 100 | 3 TO 6 | | |
| | 6.8 | 50 TO 100 | 1 TO 3 | | |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A seal assembly for use in a subterranean well comprising:
   (a) a hollow production casing having an interior polished surface;
   (b) a production tubing positioned within the casing forming an annular space between the tubing and casing;
   (c) top and bottom retainers positioned on the tubing and defining between them a seal annulus opening into the annular space and adjacent the polished surface;
   (d) an annularly shaped primary seal member positioned in the seal bore and having a cross-sectional shape with a top portion and a bottom portion, wherein the top and bottom portions are each curvilinear with a convex portion, with the convex portions positioned across a radial midpoint of the seal annulus, and wherein the primary seal member seals from the casing to the tubing;
   (e) first and second annularly shaped secondary seal members positioned in the seal annulus, wherein the first secondary seal member comprises a convex portion which convex portion abuts the convex portion of the top portion of the primary seal member, and wherein the second secondary seal member comprises a convex portion which convex portion abuts the convex portion of the bottom portion of the primary seal member, and wherein the secondary seal members each seal from the casing to the tubing.

2. The seal assembly of claim 1 wherein the primary seal member comprises a cross-sectional shape selected from the group of shapes consisting of circular, oval and elliptical cross-sectional shapes.

3. The seal assembly of claim 1 wherein the first and secondary seal menders each abut the primary seal member at the radial midpoint of the seal annulus.

4. The seal assembly of claim 1 wherein the secondary seal members each comprise a curvilinear face, with each face abutting one of the convex portions of the primary seal member.

5. The seal assembly of claim 4 wherein secondary seal members each comprise a wavy face which abut the convex portion of the primary seal member.

6. The seal assembly of claim 4 wherein secondary seal members each comprise a sinusoidal face which abuts the convex portion of the primary seal member.

7. The seal member of claim 4 wherein the secondary seal member faces comprise a convex portion which abuts the convex portion of the primary seal member.

8. The seal member of claim 4 wherein the primary seal member comprises a cross-sectional shape selected from the group of shapes consisting of oval and circular shapes, and wherein each secondary seal member comprises a convex portion which abuts convex portions of the primary seal member.

9. A seal assembly comprising:
   (a) an outer conduit;
   (b) an inner conduit positioned within the outer conduit and forming an annular space between the conduits;
   (c) an annularly shaped primary seal member positioned in the annular space, and having a cross-sectional shape with a top portion and a bottom portion, wherein the top and bottom portions are each curvilinear with a convex portion, with the convex portions positioned at a radial midpoint of the annular space, and wherein the primary seal member seals from the outer conduit to the inner conduit;
   (d) first and second annularly shaped secondary seal members positioned in the annular space, with each secondary seal member having a curvilinear face comprising a convex portion, which convex portion abuts one of the convex portions of the primary seal member, wherein the secondary seal member seals from the outer conduit to the inner conduit.

10. The seal assembly of claim 9 wherein the curvilinear face of each secondary seal member further comprises a concave portion.

11. The seal assembly of claim 9 wherein the primary seal member comprises a cross-sectional shape selected from the group of shapes consisting of circular, oval and elliptical cross-sectional shapes.

12. The seal assembly of claim 9 wherein the first and secondary seal members each abut the primary seal member at the radial midpoint of the annular space.

13. A seal assembly comprising:
   (a) an outer conduit;
   (b) an inner conduit positioned within the outer conduit and forming an annular space between the conduits:
   (c) an annularly shaped primary seal member positioned in the annular space, and having a cross-sectional shape with a top portion and a bottom portion, wherein the top and bottom portions are each curvilinear with a convex portion, with the convex portions positioned at a radial midpoint of the annularly space;
   (d) a first annularly shaped secondary seal member positioned in the annular space wherein the secondary seal member comprises a wavy face which abuts one of the convex portions of the primary seal member.

14. A seal assembly comprising:
   an outer conduit;
   (b) an inner conduit positioned within the outer conduit and forming an annular space between the conduits;
   (c) an annularly shaped primary seal member positioned in the annular space, and having a cross-sectional shape with a top portion and a bottom portion, wherein the top and bottom portions are each curvilinear with a convex portion, with the convex portions positioned at a radial midpoint of the annularly space;
   (d) a first annularly shaped secondary seal member positioned in the annular space, wherein the secondary seal member comprises a sinusoidal face which abuts one of the convex portions of the primary seal member.

15. The seal assembly of claim 9 wherein the secondary seal member comprises a face having a convex portion which abuts one of the convex portions of the primary seal member.

16. The seal assembly of claim 9
   wherein the cross-sectional shape of the primary seal member comprises a cross-sectional shape selected from the group of shapes consisting of oval and circular shapes.

17. A seal assembly comprising:
   (a) a first substrate;
   (b) a second substrate positioned adjacent the first member and forming a passage between the substrates;
   (c) a primary seal member positioned in the passage, and having a cross-sectional shape with a top portion and a bottom portion, wherein the top and bottom portions are each curvilinear with a convex portion, with the convex portions positioned at a midpoint of the passage, and wherein the primary seal member seals from the first substrate to the second substrate;
   (d) first and second secondary seal members positioned in the passage each having a convex portion which abuts the convex portion of the primary seal member, and wherein the secondary seal members each seal from the first substrate to the second substrate.

18. The seal assembly of claim 17 wherein the primary seal member comprises a cross-sectional shape selected from the group of shapes consisting of circular, oval and elliptical cross-sectional shapes.

* * * * *

UNITED STATES PATENT AND TRADEMARK OFFICE
CERTIFICATE OF CORRECTION

PATENT NO. : 5,584,489

DATED : December 17, 1996

INVENTOR(S) : PHILIP I. ABRAMS, RICHARD SHEPHERD, and JUSTIN R. HAWKES

It is certified that error appears in the above-identified patent and that said Letters Patent is hereby corrected as shown below:

In Column 8, line 4 (Claim 3), delete "menders" and insert "members".

In Column 9, line 9 (Claim 13), delete the colon at the end of the line and insert a semi-colon.

In Column 9, line 22 (Claim 14), insert "(a)" at the beginning of the line.

UNITED STATES PATENT AND TRADEMARK OFFICE
CERTIFICATE OF CORRECTION

PATENT NO. : 5,584,489
DATED : December 17, 1996
INVENTOR(S) : PHILIP I. ABRAMS, RICHARD SHEPHERD, and JUSTIN R. HAWKES It is certified that error appears in the above-identified patent and that said Letters Patent is hereby corrected as shown below:

In Column 8, line 4 (Claim 3), delete "secondary seal" and insert "second secondary seal".
In Column 9, line 16 (Claim 13), delete "annularly" and insert "annular".
In Column 9, line 31 (Claim 14), delete "annularly" and insert "annular".
In Column 10, lines 15 and 16 (Claim 17), delete "member" and insert "substrate".

Signed and Sealed this

Second Day of February, 1999

*Attest:*

*Attesting Officer*

*Acting Commissioner of Patents and Trademarks*